United States Patent
Choi et al.

(10) Patent No.: US 8,922,871 B2
(45) Date of Patent: Dec. 30, 2014

(54) ELECTROWETTING DISPLAY DEVICE AND MANUFACTURING METHOD THEREOF

(75) Inventors: Byung Seok Choi, Seoul (KR); Seung-Jin Baek, Suwon-si (KR); Ji Eun Lee, Seoul (KR); Wang Su Hong, Suwon-si (KR)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 13/591,661

(22) Filed: Aug. 22, 2012

(65) Prior Publication Data

US 2013/0215491 A1    Aug. 22, 2013

(30) Foreign Application Priority Data

Feb. 17, 2012    (KR) .................. 10-2012-0016452

(51) Int. Cl.
*G02B 26/00*    (2006.01)
*G02F 1/361*    (2006.01)

(52) U.S. Cl.
CPC ............. *G02B 26/00* (2013.01); *G02F 1/361* (2013.01)
USPC ........... 359/296; 359/245; 359/253; 359/277; 359/290; 359/297

(58) Field of Classification Search
CPC ..... G09G 3/3208; G09G 3/00; G09G 3/3413; G09G 3/36; G09G 3/3611; G09G 3/3688; G09G 5/02; G09G 5/10; G09G 5/14; G09G 5/399; G09G 5/40; G02F 1/133514; G02F 1/133603; G02F 1/133615; G02F 1/13394; G02F 1/1343; G02F 1/0107; G02F 1/1313; G02F 1/13306; G02F 1/1333; G02F 1/133345; G02F 1/133502; G02F 1/133528; G02F 1/136286; G02F 1/361; H01L 33/0041; H01L 51/0032; H01L 21/4814; H01L 21/823475; H01L 27/0629; H01L 29/517; H01L 33/005; H01L 33/18; H01L 33/44; H01L 33/58; H01L 51/0008; H01L 51/50; G02B 5/20; G02B 6/0011; G02B 6/0025; G02B 26/00; G06F 1/1601; G06F 3/041; G06F 13/04; H05K 13/022; H05K 5/0017; H05K 5/0217; H05K 7/00
USPC ........... 345/55, 77, 88, 82, 92, 173, 204, 207, 345/211, 212, 536, 690; 257/40, 43, 59, 72, 257/98, 296; 361/679.01; 438/29, 30, 241, 438/46, 652; 359/227, 242, 243, 247, 248, 359/253, 245, 277, 290, 296, 297
See application file for complete search history.

(56) References Cited

U.S. PATENT DOCUMENTS 7,852,547 B2 * 12/2010 Kim .............................. 359/296
2008/0158472 A1    7/2008 Chung et al.
(Continued)

FOREIGN PATENT DOCUMENTS

| JP | 10-123500 | 5/1998 |
| JP | 11-016679 | 1/1999 |

(Continued)

OTHER PUBLICATIONS

K Zhou, J Heikenfeld, K A Dean, E M Howard, and M R Johnson, "A full description of a simple and scalable fabrication process for electrowetting displays", J. Micromech. Microeng. 19 (2009).*

(Continued)

*Primary Examiner* — Thomas K Pham
*Assistant Examiner* — Collin X Beatty
(74) *Attorney, Agent, or Firm* — Lee & Hayes, PLLC

(57) ABSTRACT

An electrowetting display device includes: a lower substrate, a pixel electrode disposed on the lower substrate, a lower water-repellent layer disposed on the pixel electrode, a plurality of partitions disposed on the lower water-repellent layer and an oil layer disposed on the lower water-repellent layer between the partitions, and wherein the partitions include a side wall having a reverse taper structure.

25 Claims, 8 Drawing Sheets

(56) References Cited

U.S. PATENT DOCUMENTS

| | | | |
|---|---|---|---|
| 2010/0321760 A1* | 12/2010 | Hayes et al. | 359/290 |
| 2011/0181952 A1* | 7/2011 | Kim et al. | 359/485.01 |

FOREIGN PATENT DOCUMENTS

| | | |
|---|---|---|
| JP | 11-142829 | 5/1999 |
| JP | 3400636 | 2/2003 |
| JP | 2003-207804 | 7/2003 |
| JP | 2008-170632 | 7/2008 |
| JP | 2010-262309 | 11/2010 |
| JP | 4655543 | 1/2011 |
| KR | 100503681 | 7/2005 |
| KR | 1020070038611 | 4/2007 |

OTHER PUBLICATIONS

A Schultz, J. Heikenfeld, G Cernigliaro, "High Contrast Electronic Paper Enabled by XP Black SU-8 Photoresists", Converging Electronics Week—Plastic Electronics, Oct. 19-21, 2010, Dresden, Germany. Accessible via http://web.archive.org/save/http://www.plastic-electronics2010.com/programme/default_session.asp?node=48&sessionID=3.*

* cited by examiner

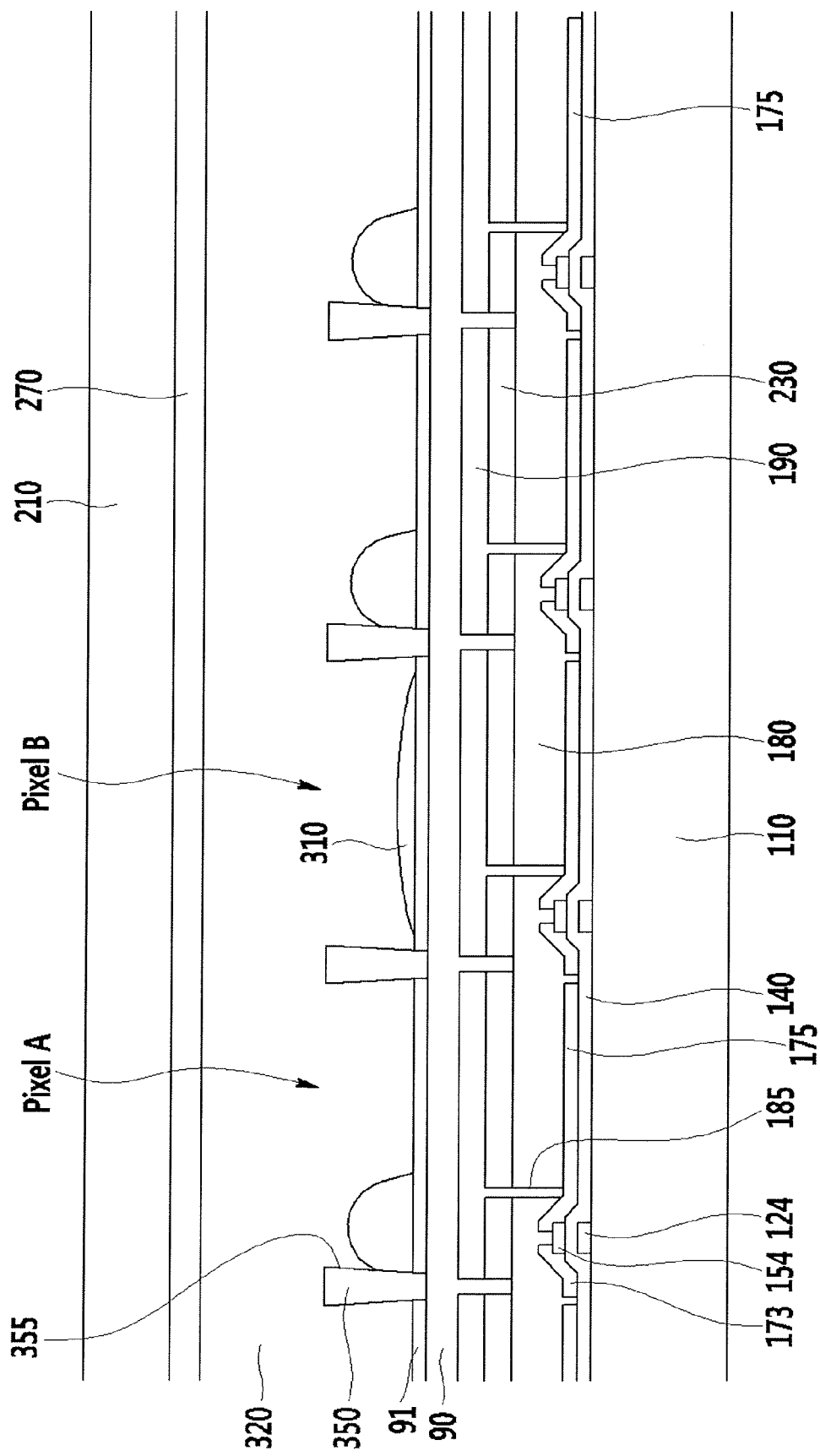

ELECTROWETTING DISPLAY DEVICE AND MANUFACTURING METHOD THEREOF

CROSS-REFERENCE TO RELATED APPLICATION

This application claims priority to Korean Patent Application No. 10-2012-0016452 filed on Feb. 17, 2012, the disclosure of which is hereby incorporated by reference herein in its entirety.

TECHNICAL FIELD

The present disclosure relates to an electrowetting display device and a manufacturing method thereof.

DISCUSSION OF THE RELATED ART

Some of the flat panel displays include, for example, a liquid crystal display (LCD), a plasma display device (PDP), an organic light emitting display (OLED), a field effect display (FED), an electrophoretic display (EPD), and an electrowetting display device (EWD).

Among them, the electrowetting display device may display a gray in pixels by, for example, controlling a movement of oil in water as an electrolyte. The electrowetting display device is a display device of a shutter type that does not use a polarizer such that transmittance may be good and a gamma characteristic according to a voltage is represented as linear. Also, the electrowetting display device may be formed of, for example, a reflective type or a transmissive type such that it may be manufactured with a shape that is suitable to an environment in which the display device is used, and a backlight may not be used in the reflective type.

The electrowetting display device uses a process for forming a thin film transistor (TFT) like other flat panel displays such as, for example, a liquid crystal display. However, unlike with liquid crystal displays, a filling process of filling the water and the oil may be required for forming an electrowetting display device. To operate the electrowetting display device, a layer positioned under the oil should be water-repellent, e.g., having hydrophobicity, but it may be difficult to form a hydrophilic layer such as a partition in the water-repellent layer. To form this partition, a reactive ion etching (RIE) treatment may be performed on the water-repellent layer. After the partition is formed, the oil is filled and the water-repellent layer should be thermal-reflowed to have the hydrophobicity for the operation of the electrowetting display device. A residue of the partition material remains in the formed water-repellent layer.

Also, a water-repellent layer material may include, an amophorous fluoropolymer such as copolymers of tetrafluoroethylene (TFE) and perfluro-2,2 dimethyl 1,3 dioxide (PDD) sold under the brand name TEFLON® AF 1600 which is a registered trademark of the E.I. DuPont de Nemours and Company Corporation, 101 West 10th St., Wilmington, Del. 19898) which may climb a wall of the partition by a capillary force in a reflow process. If the water-repellent layer is highly raised in the partition portion, this portion may be covered by the oil with a thin thickness such that there is light leakage.

SUMMARY

Exemplary embodiments of the present invention relate to an electrowetting display device and a manufacturing method thereof which may not deteriorate a characteristic of a water-repellent layer and may prevent light leakage in a corresponding portion although a water-repellent layer creeps up a wall of a partition.

An electrowetting display device according to an exemplary embodiment of the present invention includes: a lower substrate, a pixel electrode disposed on the lower substrate, a lower water-repellent layer disposed on the pixel electrode; a plurality of partitions disposed on the lower water-repellent layer and an oil layer disposed on the lower water-repellent layer between the partitions, and wherein the partitions include a side wall having a reverse taper structure.

The partitions may be disposed on the lower water-repellent layer in the form of a matrix pattern with an opening defined between the partitions, and an area of the lower surface of the partitions may be smaller than the area of the upper surface of the partitions.

The partitions may be formed of an organic layer including a black dye.

The lower water-repellent layer may have an increasing portion protruded upward along the side wall of the partitions.

The partitions may prevent light leakage generated near the partitions. The side wall having the reverse taper structure of the partitions may cover an increasing portion of the lower water-repellent layer or an increasing portion of the upper water-repellent layer.

An upper water-repellent layer disposed on the lower water-repellent layer between the partitions may be further included.

At least one of the lower water-repellent layer or the upper water-repellent layer may have an increasing portion protruded upward along the side wall of the partition.

The upper water-repellent layer may form the increasing portion while creeping up the wall of the partition with a capillary force or while being formed on the increasing portion of the lower water-repellent layer.

The oil layer may not contact with the partitions.

An upper substrate and a black matrix formed under the upper substrate may be further included. The black matrix may be disposed under the upper substrate at a position corresponding to the partitions and the black matrix is wider than an upper surface of the partitions.

A method of manufacturing an electrowetting display device according to an exemplary embodiment of the present invention includes: forming a pixel electrode on a substrate, forming a lower water-repellent layer on the pixel electrode, forming a plurality of partitions including a side wall having a reverse taper structure on the lower water-repellent layer and forming an upper water-repellent layer on the lower water-repellent layer between the partitions.

The forming of the partition may include: changing a hydrophobic characteristic of the lower water-repellent layer into a hydrophilic characteristic by performing a reactive ion etching (RIE) process on the lower water-repellent layer, depositing an organic layer including a black dye and a photoresist on the lower water-repellent layer and exposing and developing the photoresist through a mask to form a photoresist pattern. The method further includes wet-etching the photoresist pattern and the organic layer to generate an undercut to thereby form the partitions including the sidewall having the reverse taper structure.

The method may further includes hard-baking the etched partition pattern at a high temperature. The hard-baking process may cause a portion of the lower water-repellent layer having fluidity at the high temperature to thereby form an increasing portion which creeps up the side wall of the partition by a capillary force.

The method may further include changing the hydrophilic characteristic of the lower water-repellent layer into a hydrophobic characteristic through reflow of the lower water-repellent layer after forming the partition.

The upper water-repellent layer may be formed by an Inkjet method only in an opening between the partitions.

The upper water-repellent layer may form the increasing portion while the hydrophobic insulating material injected by the inkjet method creeps up the side wall of the partition by a capillary force.

At least one of the lower water-repellent layer or the upper water-repellent layer may be formed with the increasing portion near the partitions. The side wall of the partitions having the reverse taper structure may prevent light leakage generated near the partition. Moreover, the side wall having the reverse taper structure of the partitions may cover an increasing portion of at least one of the lower water-repellent layer or the upper water-repellent layer.

The method may further include, after forming the upper water-repellent layer, forming a black oil layer on the lower water-repellent layer between the partitions.

The black oil layer does not contact with the partitions.

The method may further include forming an upper substrate, forming a black matrix under the upper substrate, and wherein the black matrix may be disposed at a position corresponding to the partitions and is wider than an upper surface of the partitions.

An electrowetting display device according to an exemplary embodiment of the present invention includes a lower substrate, a pixel electrode formed on an upper surface of the lower substrate, a lower water-repellent layer formed on the pixel electrode, a plurality of partitions formed on the lower water-repellent layer, wherein the partitions comprise a sidewall having a reverse taper structure, an upper water-repellent layer formed on the lower water-repellent layer and inside an opening defined between the partitions. A portion of at least one of the lower water-repellent layer or the upper water-repellent layer protrudes upward along the side wall of the partitions.

The electrowetting display device further includes an oil layer formed on the upper water-repellent layer in the opening between the partitions, an upper substrate facing the lower substrate, a common electrode formed on a lower surface of the upper substrate and an aqueous solution layer disposed between the oil layer and the common electrode.

In the electrowetting display device according to an exemplary embodiment of the present invention, the partition has the reverse taper structure, and thereby the portion of a water-repellent layer creeping up the side wall of the partition is covered by the side wall having the tapered structure of the partition so as to not generate the light leakage. Also, after the partition is formed, an additional water-repellent layer is formed such that the residue of the partition does not generate any impurities between the water-repellant layers and the oil layer and the hydrophobic characteristic of the water-repellent layers is not deteriorated.

BRIEF DESCRIPTION OF THE DRAWINGS

Exemplary embodiments of the present invention can be understood in more detail from the following detailed description when taken in conjunction with the accompanying drawings in which:

FIG. 1 is a cross-sectional view of an electrowetting display device according to an exemplary embodiment of the present invention.

DETAILED DESCRIPTION OF EXEMPLARY EMBODIMENTS

Figure 2A:
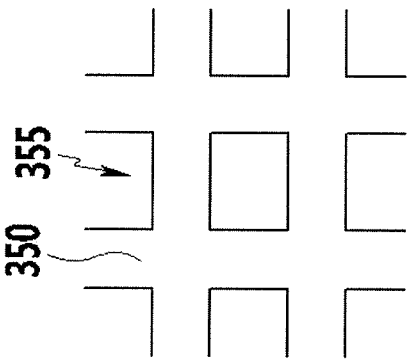
FIG. 2A is a plan view of the electrowetting display device of FIG. 2 illustrating partitions arranged in the form of a matrix pattern with openings defined between the partitions.

Exemplary embodiments of the present invention will be described more fully hereinafter with reference to the accompanying drawings, in which exemplary embodiments of the invention are shown.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

As used herein, the singular forms, "a", "an", and "the" are intended to include plural forms as well, unless the context clearly indicates otherwise.

Now, an electrowetting display device according to an exemplary embodiment of the present invention will be described with reference to the accompanying drawings.

Firstly, a display device according to an exemplary embodiment of the present invention will be described with reference to FIG. 1.

FIG. 1 is a cross-sectional view of an electrowetting display device according to an exemplary embodiment of the present invention.

As shown in FIG. 1, the electrowetting display device according to an exemplary embodiment of the present invention is a transmissive electrowetting display device which includes, for example, a lower substrate 110 having a pixel electrode 190 formed thereon, an upper substrate 210 facing the lower substrate 110 and having a common electrode 270 formed thereon, and electro-optic layers positioned between the lower substrate 110 and the upper substrate 210. The lower substrate 110 includes, for example, partitions 350 having a reverse taper structure formed thereon. A plurality of openings 355 (spaces between partitions) are defined between the partitions 350. The electro-optic layers include, for example, an oil layer 310 and an aqueous solution layer 320. The oil layer 310 is disposed inside the opening 355 between the partitions 350 and the aqueous solution layer 320 is positioned between the oil layer 310 and the common electrode 270. The oil layer 310 can be composed of an oil including, for example, hexadecane, decane, dodecane or tetradecane. In the present embodiment, the oil layer 310 includes black oil. Alternatively, in an embodiment, the oil layer 310 may also be composed of other oils such as, for example, red oils, blue oils, green oil, magenta oils, yellow oils and cyan oils.

The aqueous solution layer 320 may include a polar liquid such as, for example, water or a salt solution such as, for example, a solution of sodium chloride or potassium chloride in water The lower substrate 110 and the upper substrate 210 may be, for example, a flexible substrate or a rigid substrate. For example, the lower substrate 110 and the upper substrate 210 may include flexible substrates made of glass, plastic, or a glass fiber reinforced plastic (FRP).

Gate electrodes 124 connected to a plurality of gate lines extending in one direction are formed on the lower substrate 110. A gate insulating layer 140 is formed on the gate lines and the gate electrodes 124. The gate insulating layer 140 may be made of, for example, silicon nitride (SiNx), silicon oxide (SiOx), silicon oxynitride (SiOxNy), aluminum oxide (AlOx), yttrium oxide ($Y_2O_3$), hafnium oxide (HfOx), zirconium oxide (ZrOx), aluminum nitride (AlN), aluminum oxynitride (AlNO), titanium oxide (TiOx), barium titanate (BaTiO3), lead titanate ($PbTiO_3$), or a combination thereof.

A semiconductor layer 154 made of, for example, amorphous silicon (e.g. hydrogenated amorphous silicon) is formed on the gate insulating layer 140. Alternatively, the semiconductor layer 154 may be formed of, for example, polysilicon, micro-crystal silicon, or single crystal silicon.

The semiconductor layer 154 forms a channel of the thin film transistor. A data line and a drain electrode 175 are formed on the gate insulating layer 140 and the semiconductor layer 154. The data line extends in a direction, for example, perpendicular to the gate line thereby intersecting the gate line, and a branch extended from the data line forms a source electrode 173. At least portions of a pair of a source electrode 173 and a drain electrode 175 are positioned on the semiconductor layer 154, and they are separated from each other and are located opposite to each other with respect to the gate electrode 124.

An ohmic contact is positioned between the semiconductor layer 154, and the source electrode 173 and the drain electrode 175, thereby reducing contact resistance therebetween. The ohmic contact layer 154 may include, for example, amorphous silicon doped with n-type or p-type impurities. Alternatively, the ohmic contact layer 154 may include, for example, an oxide semiconductor layer. For example, the ohmic contact layer 154 may include an oxide semiconductor layer that includes one or more of the following elements: indium (In), gallium (Ga), zinc (Zn), tin (Sn), germanium (Ge), hafnium (Hf), and arsenide (As). For example, the ohmic contact layer 154 may include, for example, zinc oxide (ZnO), tin oxide ($SnO_2$), indium oxide ($In_2O_3$), zinc stannate ($Zn_2SnO_4$), gallium oxide ($Ga_2O_3$), and hafnium oxide ($HfO_2$) in the oxide semiconductor layer.

A passivation layer 180 made of, for example, an inorganic insulating material such as silicon oxide or silicon nitride or an organic material is formed on the source electrode 173, the drain electrode 175, the semiconductor layer 154, and the gate insulating layer 140. For example, the organic material of the passivation layer 180 may include benzocyclobutene (BCB), acryl-based resin or a combination thereof.

A color filter 230 is formed on the passivation layer 180. The color filter 230 includes, for example, a pigment only transmitting a predetermined wavelength or that may be made of a quantum dot (semiconductor nanocrystal) material. For example, the quantum dot material as the semiconductor material having a crystalline structure with a size of several nanometers includes several hundred to several thousand atoms, and the size thereof is very small such that a surface area per unit volume is wide and a quantum confinement effect appears. Accordingly, beneficial physical and chemical characteristics that are different from the corresponding original characteristics of the semiconductor material may appear.

For color display, each pixel PX represents one of primary colors (e.g., spatial division) or each pixel PX sequentially represents the primary colors in turn (e.g., temporal division), such that a spatial or temporal sum of the primary colors is recognized as a desired color. An example of a set of the primary colors includes but is not limited to red, green, and blue colors.

A pixel electrode 190 made of, for example, a transparent conductive material such as ITO (indium tin oxide), IZO (indium zinc oxide), aluminum zinc oxide (AZO), or cadmium tin oxide (CTO), is formed on the color filter 230. Alternatively, in an embodiment, the pixel electrode 190 may be formed of, for example, a reflective electric conductor such as aluminum (Al), gold (Au), silver (Ag), copper (Cu), iron (Fe), titanium (Ti), tantalum (Ta), molybdenum (Mo), rubidium (Rb), tungsten (W), and alloys, or combinations thereof.

The passivation layer 180 and the color filter 230 have a contact hole 185 exposing the drain electrode 175. The pixel electrode 190 is physically and electrically connected to the drain electrode 175 through the contact hole 185.

A lower water-repellent layer 90 is formed on the pixel electrode 190, and the lower water-repellent layer 90 is formed of, for example, a hydrophobic insulating material. The hydrophobic insulating material may include, for example, amorphous fluoropolymers such as copolymers of tetrafluoroethylene (TFE) and perfluro-2,2 dimethyl 1,3 dioxide (PDD), sold under the brand name TEFLON® AF 1600 which is a registered trademark of the E.I. DuPont de Nemours and Company Corporation, 101 West 10th St., Wilmington, Del. 19898). Alternatively, other low surface energy polymers such as, for example, parylene may be used to form the lower water-repellent layer 90.

Partitions 350 are formed on the lower water-repellent layer 90. The partitions 350 are formed on the lower water-repellent layer in, for example, the form of a matrix pattern with openings 355 defined between the partitions 350. Exemplary embodiments of the present invention are not limited to the partitions 350 being formed in the form of a matrix pattern but rather the partitions 350 may be arranged in various ways. The partitions 350 include, for example, a side wall formed with a reverse taper structure such that the area of the lower surface of the partitions 350 is smaller than the area of the upper surface of the partitions 350. Also, the partitions 350 are formed of, for example, an organic layer including a black dye or pigment. Alternatively, in an embodiment, the partitions 350 may be formed of an organic layer including, for example, other dyes or pigments of primary colors such as red, green, cyan, magenta, blue, or yellow.

An upper water-repellent layer 91 is formed on the lower water-repellent layer 90 between the openings of the partitions 350. The upper water-repellent layer 91 may be formed with, for example, the same hydrophobic insulating material as the lower water-repellent layer 90 such as the amorphous fluoropolymers which include copolymers of tetrafluoroethylene (TFE) and perfluro-2,2 dimethyl 1,3 dioxide (PDD) sold under the brand name TEFLON® AF 1600 which is a registered trademark of the E.I. DuPont de Nemours and Company Corporation, 101 West 10th St., Wilmington, Del.

19898). Alternatively, other low surface energy polymers such as, for example, parylene may be used to form the upper water-repellent layer 91.

The oil layer 310 is formed in the opening and on the upper water-repellent layer 91. In the present exemplary embodiment, the oil layer 310 includes black oil but as discussed above, exemplary embodiments of the present invention are not limited to black oil but rather, for example, other colored oils mentioned above may also be used to form the oil layer 310.

The common electrode 270 that is integrally formed is formed on a lower surface of the upper substrate 210.

Further, the aqueous solution layer 320 is formed between the partition 350 and the oil layer 310, and the common electrode 270. The aqueous solution layer 320 is not mixed with the oil layer 310.

Surface tension of the aqueous solution layer 320 is not changed in a pixel B in which an electric field is not formed between the pixel electrode 190 and the common electrode 270 such that the oil layer 310 covers the entire corresponding pixel. Accordingly, the light incident from a lower side of the pixel is not emitted in an upper side of the pixel, and thereby black is displayed.

Meanwhile, the surface tension of the aqueous solution layer 320 is changed in a pixel A in which an electric field is formed between the pixel electrode 190 and the common electrode 270 such that the oil layer 310 is accumulated together, thereby opening the corresponding pixel. Accordingly, the light incident from the lower side of the pixel is emitted in the upper side of the pixel such that the pixel displays a color according to the color filter 230.

According to an exemplary embodiment, the color filter 230 may be omitted. When the flat panel display according to an exemplary embodiment of the present invention does not include the color filter 230, the pixel may display a black and a white gray such that the flat panel display may be used as a black and white display device.

To describe the partitions 350 and the upper and lower water-repellent layers 90 and 91 in more detail, an enlarged cross-sectional view of the electrowetting display device according to an exemplary embodiment of the present invention will be described with reference to FIG. 2 and FIG. 2A.

Figure 2:
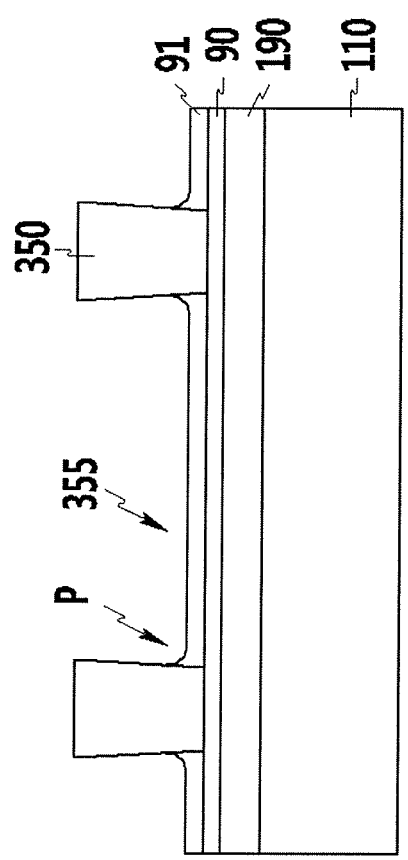
FIG. 2 is an enlarged cross-sectional view of an electrowetting display device according to an exemplary embodiment of the present invention.

FIG. 2 is an enlarged cross-sectional view of an electrowetting display device according to an exemplary embodiment of the present invention which focuses on and enlarges the lower substrate 110 and certain elements formed thereon. FIG. 2A is a plan view of the electrowetting display device of FIG. 2 illustrating partitions arranged in the form of a matrix pattern with openings defined between the partitions.

In FIG. 2, the thin film transistor (the gate electrode 124, the source electrode 173, the drain electrode 175, and the conductor layer) formed on the lower substrate 110 is omitted, and a structure of the pixel electrode 190 is shown.

A pixel electrode 190 is formed on the lower substrate 110. In FIG. 2, the pixel electrode 190 is integrally formed, but the pixel electrode 190 is electrically separated for each pixel in reality. FIG. 2 shows a schematic layer where the pixel electrode 190 is formed and a boundary for each pixel electrode 190 is not shown.

The lower water-repellent layer 90 is formed on the pixel electrode 190, and partitions 350 are formed thereon. The lower water-repellent layer 90 has hydrophobicity such that an RIE (reactive ion etching) process should be performed on the lower water-repellent layer 90 to form the partitions 350.

As shown in FIGS. 2 and 2A, the partitions 350 are formed on the lower water-repellent layer 90 in the form of, for example, a matrix pattern with openings 355 defined between the partitions 350. The partitions 350 include a side wall formed with the reverse taper structure such that the area of the lower surface of the partitions 350 is smaller than the area of the upper surface of the partitions 350. Also, the partitions 350 are formed with, for example, an organic layer including a black dye or pigment.

The upper water-repellent layer 91 is formed in the opening 355 between the partitions 350 on the lower water-repellent layer 90. The upper water-repellent layer 91 should be formed in the opening 355 between the partitions 350. Thus, the upper water-repellent layer 91 is formed by positioning the hydrophobic insulating material at only this corresponding position of the opening 355 by using, for example, an Inkjet method. At this time, a portion (hereinafter referred to as an increasing portion P) having a structure protruded upward while creeping up the side wall of the partitions 350 by a capillary force is formed as shown in FIG. 2. Meanwhile, FIG. 2 shows the structure in which only the upper water-repellent layer 91 creeps up the side wall of the partitions 350. However, the increasing portion P may be formed while the lower water-repellent layer 90 creeps up the side wall of the partitions 350 and the upper water-repellent layer 91 formed thereon may have the increasing portion P creeping up the partitions 350.

An angle of the reverse taper of the partitions 350 may be determined by a degree in which the upper water-repellent layer 91 and the lower water-repellent layer 90 creep up the partitions 350. That is, the oil layer 310 is covered at the corresponding portion while the upper water-repellent layer 91 and lower water-repellent layer 90 creeps up the partitions 350 such that the light leakage may be generated, and the reverse taper angle of the partitions 350 capable of covering the light leakage solves this. For example, in FIG. 1, the black matrix is not formed in the upper substrate 210 such that it may be necessary for the partitions 350 to block the light leakage.

Next, a manufacturing method of an electrowetting display device according to an exemplary embodiment of the present invention will be sequentially described with reference to FIGS. 3 to 5.

Figure 3:
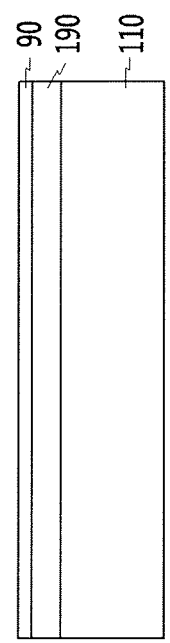
FIG. 3 and FIG. 4 are cross-sectional views showing manufacturing steps of an electrowetting display device according to an exemplary embodiment of the present invention.
Figure 4:
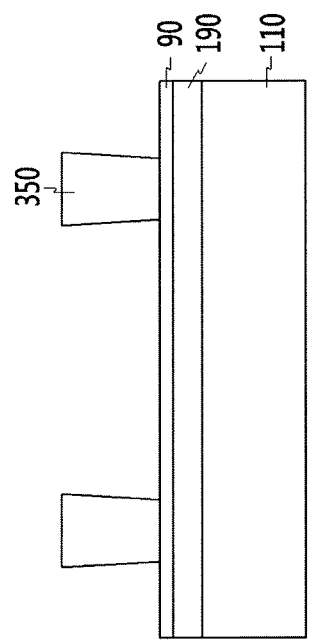
Figure 5:
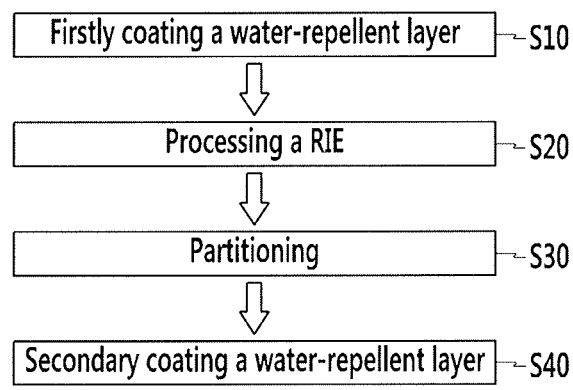
FIG. 5 is a flowchart of a manufacturing method of an electrowetting display device according to an exemplary embodiment of the present invention.

FIG. 3 and FIG. 4 are cross-sectional views showing manufacturing steps of an electrowetting display device according to an exemplary embodiment of the present invention, and FIG. 5 is a flowchart of a manufacturing method of an electrowetting display device according to an exemplary embodiment of the present invention.

As shown in FIG. 3, a pixel electrode 190 made of, for example, transparent conductive material such as, for example, ITO, IZO, AZO, CTO is formed on the lower substrate 110. The lower water-repellent layer 90 made of, for example, the hydrophobic insulating material described in connection with FIGS. 1 and 2 is formed on the pixel electrode 190.

Next, as shown in FIG. 4, the partitions 350 are made of the organic layer including the black dye or pigment is formed. The partitions 350 may also be formed of an organic layer including, for example, other dyes or pigments of primary colors such as red, green, cyan, magenta, blue, or yellow.

Firstly, to form the partitions 350 on the lower water-repellent layer 90, the hydrophobic characteristic of the lower water-repellant layer 90 is changed into a hydrophilic characteristic through, for example, a RIE (reactive ion etching) process performed on the lower water-repellant layer 90. Next, for example, after the organic layer including the black dye and a photoresist are deposited, the photoresist is exposed and developed through a mask to form a photoresist pattern, and then the organic layer is wet-etched to generate an undercut, thereby forming the partitions 350 having the reverse taper structure. According to an exemplary embodiment, dry etching may be performed.

To complete the partitions 350, the partitions 350 should be hard baked at a high temperature. The formed lower water-repellent layer 90 having fluidity at a high temperature may creep up the side wall of the partition 350 by a capillary force. However, the side wall of the partitions 350 are reverse-tapered such that the degree of creeping up the partitions 350 may be relatively small.

Next, as shown in FIG. 2, the upper water-repellent layer 91 is formed in the opening 355 between the partitions 350 on the lower water-repellent layer 90. So as to not form the upper water-repellent layer 91 on the upper surface of the partitions 350, the upper water-repellent layer 91 should only be formed in the opening 355 between the partitions 350 by using, for example, an Inkjet method. Thus, as the upper water-repellant layer 91 should be formed only inside the opening 355, the hydrophobic insulating material used to form the upper water-repellent layer 91 is only positioned within the opening 355 between the partitions 350 by using, for example, the Inkjet method. At this time, as shown in FIG. 2, the portion (hereinafter referred to as the increasing portion P) having the structure that is protruded upward while creeping up the side wall of the partitions 350 by the capillary force (capillary force) is formed. Meanwhile, the lower water-repellent layer 90 forms the increasing portion P near the partitions 350 and may have the increasing portion P while the upper water-repellent layer 91 is formed.

The lower water-repellent layer 90 is changed to an insulating material having hydrophilic characteristics to form the partitions 350, but the upper water-repellent layer 91 is formed of the hydrophobic insulating material and the RIE process is executed such that the hydrophobicity of the upper water-repellent layer 91 is maintained as it is. According to an exemplary embodiment, the reflow process may be again executed on the lower water-repellent layer 90 such that the hydrophilic characteristic of the lower water-repellent layer 90 is changed to a hydrophobic characteristic. The lower water-repellent layer 90 may functions to increase the adherence of the upper water-repellent layer 91.

Also, when the residue of the material used to form the partitions 350 remains after forming the partitions 350, the upper water-repellent layer 91 may cover the residue such that impurities may not be generated between the upper water-repellent layer 91 and the oil layer 310, and thereby the operational characteristics of the oil layer 310 may not be deteriorated.

In the increasing portion P where the lower water-repellent layer 90 and/or the upper water-repellent layer 91 is protruded upward close to the partitions 350, the oil layer 310 may be thinly formed such that the light may leak. However, the partitions 350 have the reverse taper structure such that the upper surface of the partitions 350 may prevent the light leakage and thus not increase the black luminance of the electrowetting display device. That is, the degree of preventing the light leakage in the increasing portion P of the upper and lower water-repellent layers 90 and 91 may depend upon the degree of the reverse tapering of the partitions 350, and particularly, when the black matrix is not formed in the upper substrate 210. When the reverse taper structure of the partitions 350 does not prevent the light leakage, the increasing portion P of at least the lower and upper water-repellent layers 90 and 91 may be covered. At this time, a separate black matrix may be formed.

FIG. 5 is a flowchart simply showing the above-described manufacturing method.

The water-repellent layer of the hydrophobic insulating material is firstly coated on the pixel electrode 190 to form the lower water-repellent layer 90 (S10). The RIE process is executed on the lower water-repellent layer 90 to have the hydrophilic characteristic (S20). Next, the partitions 350 having a side wall with a reverse taper structure are formed on the lower water-repellent layer 90 in the form of a matrix pattern with openings 355 defined between the partitions 350 (S30). The method of forming the partitions 350 having the reverse taper structure may be performed in various ways in accordance with exemplary embodiments of the present invention. For example, in the present exemplary embodiment, after the organic layer having the black dye and the photoresist are deposited, the photoresist is exposed and developed through the mask to form the photoresist pattern, and the organic layer is wet-etched to form the partitions 350 having the reverse taper structure. Next, the partitions 350 are completed through, for example, hard baking. At this time, the phenomenon that the lower water-repellent layer 90 creeps up the side wall of the partitions 350 may be generated. However, the side wall of the partitions 350 have the reverse taper structure such that the degree of creeping up the partitions 350 may be relatively small.

Next, the hydrophobic insulating material is secondly coated on the lower water-repellent layer 90 in the opening 355 between the partitions 350 to form the upper water-repellent layer 91 (S40). The upper water-repellent layer 91 is only formed in the openings 355 between the partitions 350 by using, for example, the Inkjet method so as to not be formed on the upper surface of the partitions 350. At this time, the increasing portion P protruded upward while the upper water-repellent layer 91 creeps up the wall of the partitions 350 by the capillary force is formed. Also, when the lower water-repellent layer 90 already forms the increasing portion P near the partitions 350, the upper water-repellent layer 91 is formed on the increasing portion P of the lower water-repellent layer 90, thereby having the increasing portion P.

Next, a step of filling the oil layer 310 (e.g. black oil) on the upper water-repellent layer 91 between the partitions 350 is executed.

As described above, the partitions 350 having the reverse taper shape are formed, thereby preventing the light leakage from being generated near the partition 350. Also, the upper water-repellent layer 91 is formed after the partitions 350 are formed such that a layer having the hydrophobic characteristic that is not deteriorated contacts the oil layer 310 thereby increasing the operational characteristics of the oil layer 310. Although the residue of the material used to form the partitions 350 may remain after the partitions 350 have been formed, the upper water-repellent layer 91 is formed on the residue such that impurities may not be generated between the upper water-repellent layer 91 and the oil layer 310, and thereby the operational characteristics of the oil layer 310 may not be deteriorated.

In the electrowetting display device of FIG. 1, only the common electrode 270 is formed in the upper substrate 210. However, if it becomes difficult to prevent the light leakage through the reverse tapered partition 350, the upper substrate 210 may further include, for example, a black matrix 220, and this will be described with reference to FIG. 8.

Figure 8:
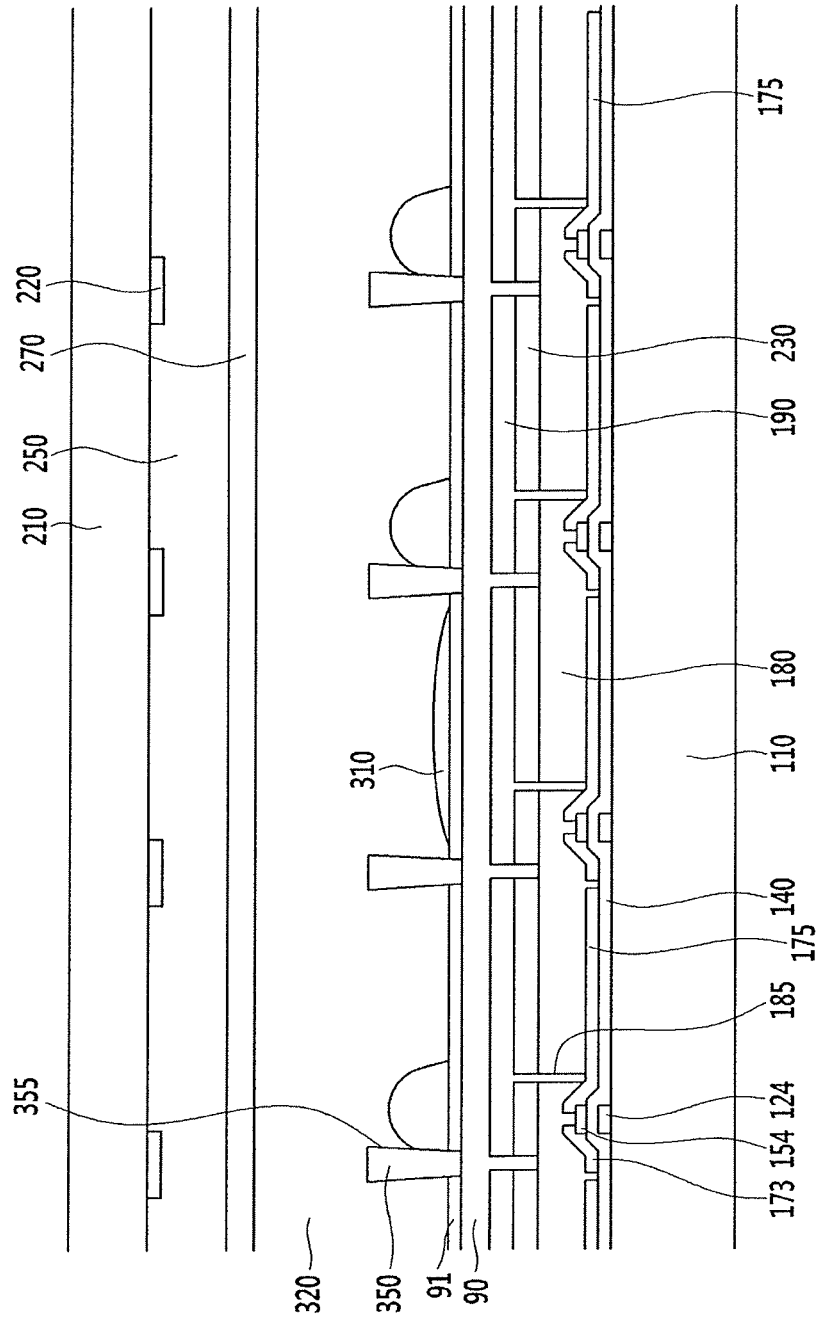
FIG. 8 is a cross-sectional view of an electrowetting display device according to an exemplary embodiment of the present invention.

FIG. 8 is a cross-sectional view of an electrowetting display device according to an exemplary embodiment of the present invention.

Referring to FIG. 8, differently from FIG. 1, the black matrix 220 is formed on the upper substrate 210. That is, the black matrix 220 having an opening is formed under the upper substrate 210. A flatness layer 250 is formed under the black matrix 220 and the upper substrate 210, and the common electrode 270 is formed under the flatness layer 250.

For example, the black matrix 220 is formed at a position corresponding to the partitions 350, and is wider than the upper surface of the partitions 350. As a result, the light leakage generated near the partitions 350 may be prevented. Also, the black matrix 220 covers the region where the image is not displayed such as the thin film transistor.

In FIG. 8, the black matrix 220 is formed such that it is not necessary for the partition 350 to prevent the light leakage near the partitions 350. At this time, the partitions 350 may be formed to such a degree that they cover the increasing portion of the lower and upper water-repellent layers 90 and 91 with its the reverse taper structure.

In FIG. 8, the color filter 230 is positioned on the passivation layer 180 formed on the lower substrate 110. Alternatively, in an exemplary embodiment, the color filter 230 may instead be positioned on the flatness layer 250 between the openings of the black matrix 220 of the upper substrate 210.

Next, the characteristics of the partitions 350 having the reverse taper structure will be described with reference to FIG. 7 and FIG. 6.

Firstly, FIG. 6 will be described.

Figure 6:
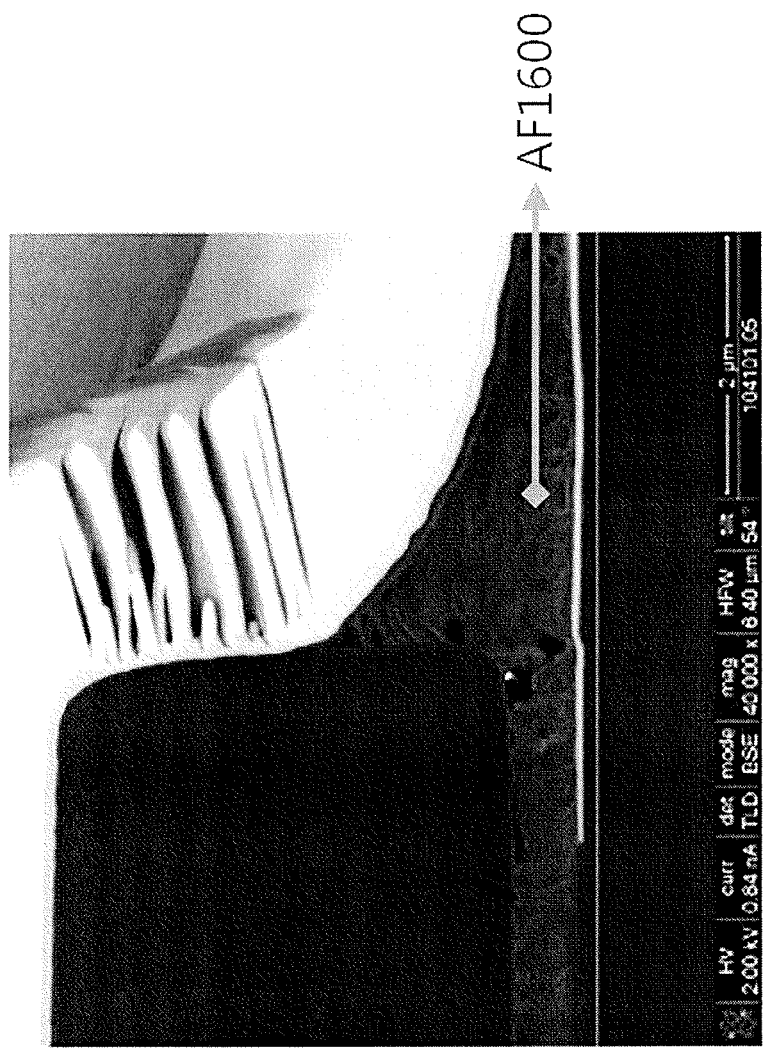
FIG. 6 is a photograph of a water-repellent layer that is raised upward along a partition.

FIG. 6 is a photograph of a water-repellent layer creeping up a partition.

The partition of FIG. 6 does not have the reverse taper structure, and the water-repellent layer formed of an amophorous fluoropolymer which includes copolymers of tetrafluoroethylene (TFE) and perfluro-2,2 dimethyl 1,3 dioxide (PDD), sold under the brand name TEFLON® AF 1600 which is a registered trademark of the E.I. DuPont de Nemours and Company Corporation, 101 West 10th St., Wilmington, Del. 19898). TEFLON® AF 1600 forms the increasing portion along the side wall of the partition.

However, like an exemplary embodiment of the present invention, when the partition has the reverse taper structure, it may be difficult for the water-repellent layer to readily creep up the side wall of the partition such that the increasing portion may be relatively small, and thereby the oil layer may be relatively uniform and the light leakage may be reduced. If the light leakage is generated, in an exemplary embodiment of the present invention, the partition has the reverse taper structure such that the upper surface of the partition may prevent the light leakage.

Next, another characteristic of the reverse taper structure according to an exemplary embodiment of the present invention will be described with reference to FIG. 7.

Figure 7:
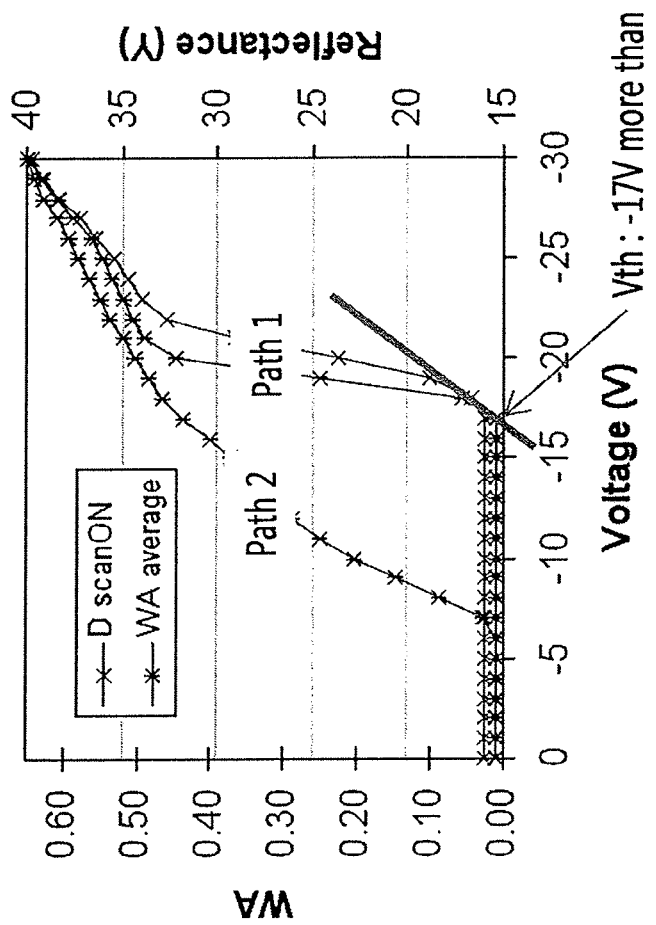
FIG. 7 is a graph of hysteresis of an oil layer operated according to a voltage.

FIG. 7 is a graph of hysteresis of an oil layer operated according to a voltage. In the following graph, the oil layer 310 includes black oil. It is noted that label WA in FIG. 7 represents the hysteresis of oil.

In general, the oil layer 310 which includes black oil has different operation characteristics when being attached to the partition 350 or not. That is, when the oil layer 310 including black oil is adhered to the partition 350, the threshold voltage Vth exists like in path 1 of FIG. 7 such that the oil layer 310 including black oil is separated from the partition 350 to be operated when a voltage of less than the threshold voltage is applied. However, the oil layer 310 including black oil departed from the partition 350 is operated according to a path 2. The path 1 is quickly moved while passing the threshold voltage. However, the path 2 is relatively uniformly moved such that the path 2 may be easier for operating the oil layer 310 including black oil in the electrowetting display device compared with the path 1. That is, when the partition 350 and the oil layer 310 including black oil are departed with the constant interval at a time when the partition 350 has the reverse taper structure and the lower and upper water-repellent layers 90 and 91 have the increasing portion, the oil layer 310 including black oil may not easily contact the partition 350. Consequently, as a result, the oil layer 310 including black oil may be operated according to the path 2 such that the oil layer 310 including black oil is smoothly operated.

Meanwhile, in an exemplary embodiment of present invention illustrated in FIG. 1 and FIG. 8, the transmissive type of electrowetting display device is shown. Alternatively, the electrowetting display device may be a reflective type according to an exemplary embodiment. In this case, the pixel electrode 190 may be formed of, for example, a reflective metal or a reflecting electrode may be additionally formed on or under the pixel electrode 190. For example, in an embodiment including a reflective type of electrowetting display device, the pixel electrode 190 or a reflecting electrode may be formed of aluminum (Al), gold (Au), silver (Ag), copper (Cu), iron (Fe), titanium (Ti), tantalum (Ta), molybdenum (Mo), rubidium (Rb), tungsten (W), and alloys, or combinations thereof.

Having described exemplary embodiments of the present invention, it is further noted that it is readily apparent to those of ordinary skill in the art that various modifications may be made without departing from the spirit and scope of the invention which is defined by the metes and bounds of the appended claims.

What is claimed is:

1. An electrowetting display device comprising:
   a lower substrate;
   a pixel electrode disposed on the lower substrate;
   a lower water-repellent layer comprising a first material disposed on the pixel electrode;
   partitions disposed on the lower water-repellent layer, wherein the partitions have a reverse taper cross-section so that a thickness of the partitions decreases in a direction from a top of the partitions toward the lower water-repellent layer;
   an upper water-repellent layer comprising a second material different from the first material of the lower water-repellent layer, the upper water-repellent layer disposed (i) on the lower water-repellent layer and (ii) between the partitions; and
   an oil layer disposed on the upper water-repellent layer between the partitions.

2. The electrowetting display device of claim 1, wherein the oil layer includes black oil.

3. The electrowetting display device of claim 1, wherein the partitions are disposed on the lower water-repellent layer in the form of a matrix pattern with an opening defined between the partitions, and wherein an area of a lower surface of the partitions is smaller than an area of the upper surface of the partitions.

4. The electrowetting display device of claim 3, wherein the partitions are formed of an organic layer comprising a black dye.

5. The electrowetting display device of claim 1, wherein the lower water-repellent layer has an increasing portion protruded upward along the partitions.

6. The electrowetting display device of claim 5, wherein the partitions having the reverse taper cross-section covers the increasing portion of the lower water-repellent layer or an increasing portion of the upper water-repellent layer protruded upward along the partitions.

7. The electrowetting display device of claim 1, further comprising:

impurities comprising residue of material used to form the partitions, the impurities disposed between the upper water-repellent layer and the lower water-repellent layer.

8. The electrowetting display device of claim 1, wherein at least one of the lower water-repellent layer or the upper water-repellent layer has an increasing portion protruded upward along the side wall of the partitions.

9. The electrowetting display device of claim 8, wherein the increasing portion includes a portion of the lower water-repellent layer protruded upward along the partitions.

10. The electrowetting display device of claim 8, wherein the increasing portion includes a portion of the lower water-repellent layer protruded upward along the partitions and a portion of the upper water-repellent layer protruded upward along the partitions.

11. The electrowetting display device of claim 1, wherein the oil layer does not contact with the partitions.

12. The electrowetting display device of claim 1, further comprising:
an upper substrate; and
a black matrix disposed under the upper substrate at a position which corresponds to the partitions and wherein the black matrix is wider than an upper surface of the partitions.

13. The electrowetting display device of claim 12, further comprising:
a flatness layer disposed under the black matrix and the upper substrate; and
a common electrode disposed under the flatness layer.

14. A method manufacturing an electrowetting display device comprising:
forming a pixel electrode on a substrate;
forming a lower water-repellent layer on the pixel electrode;
forming partitions having a reverse taper cross-section on the lower water-repellent layer; and
forming an upper water-repellent layer on the lower water-repellent layer between the partitions,
wherein an angle of the reverse taper cross-section of the partitions is based, at least in part, on a degree by which the upper water-repellent layer and the lower water-repellent layer creep up the partitions.

15. The method of claim 14, wherein
the forming of the partitions comprise:
changing a hydrophobic characteristic of the lower water-repellent layer into a hydrophilic characteristic by performing a reactive ion etching (RIE) process on the lower water-repellent layer;
depositing an organic layer comprising a black dye and a photoresist on the lower water-repellent layer;
exposing and developing the photoresist through a mask to form a photoresist pattern; and
wet-etching the photoresist pattern and the organic layer to generate an under-cut to thereby form the partitions.

16. The method of claim 15, further comprising:
hard-baking the etched partition pattern at a high temperature, and
wherein the hard baking process causes a portion of the lower water-repellent layer having fluidity at the high temperature to thereby form an increasing portion which creeps up the partitions by a capillary force.

17. The method of claim 15, further comprising:
changing the hydrophilic characteristic of the lower water-repellent layer into a hydrophobic characteristic through reflow of the lower water-repellent layer after forming the partitions.

18. The method of claim 14, wherein the upper water-repellent layer is formed by an Inkjet method only in an opening between the partitions.

19. The method of claim 18, wherein the upper water-repellent layer forms an increasing portion while hydrophobic insulating material injected by the inkjet method creeps up the partitions by a capillary force.

20. The method of claim 14, wherein at least one of the lower water-repellent layer or the upper water-repellent layer is formed with an increasing portion near the partitions, and
wherein the reverse taper cross-section of the partitions cover the increasing portion of at least one of the lower water-repellent layer or the upper water-repellent layer.

21. The method of claim 14, further comprising:
after forming the upper water-repellent layer, forming a black oil layer on the lower water-repellent layer between the partitions.

22. The method of claim 21, wherein
the black oil layer does not contact with the partitions.

23. The method of claim 14, further comprising:
forming an upper substrate;
forming a black matrix under the upper substrate,
wherein the black matrix is disposed at a position corresponding to the partitions and is wider than an upper surface of the partitions.

24. An electrowetting display device comprising:
a lower substrate;
a pixel electrode formed on an upper surface of the lower substrate;
a lower water-repellent layer comprising a first material formed on the pixel electrode;
a plurality of partitions formed on the lower water-repellent layer, wherein the partitions have a reverse taper cross-section;
an upper water-repellent layer comprising a second material different from the first material of the lower water-repellent layer, the upper water-repellent layer formed on the lower water-repellent layer and inside an opening defined between the partitions, wherein a portion of at least one of the lower water-repellent layer or the upper water-repellent layer protrudes upward along the side wall of the partitions;
an oil layer formed on the upper water-repellent layer in the opening between the partitions;
an upper substrate facing the lower substrate;
a common electrode formed on a lower surface of the upper substrate; and
an aqueous solution layer disposed between the oil layer and the common electrode.

25. The electrowetting display device of claim 24, wherein the oil layer includes black oil and wherein the lower water-repellent layer and the upper water-repellent layer are each formed of different amorphous fluoropolymers.

* * * * *